(12) United States Patent
Komatsu et al.

(10) Patent No.: US 6,494,172 B2
(45) Date of Patent: Dec. 17, 2002

(54) APPARATUS AND METHOD FOR CONTROLLING ELECTROMAGNETICALLY OPERABLE ENGINE VALVE ASSEMBLY

(75) Inventors: Seigo Komatsu, Yokohama (JP); Ikuhiro Taniguchi, Kanagawa (JP); Taketoshi Kawabe, Kanagawa (JP); Shigeru Nakajima, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/862,441

(22) Filed: May 23, 2001

(65) Prior Publication Data

US 2001/0047780 A1 Dec. 6, 2001

(30) Foreign Application Priority Data

Jun. 6, 2000 (JP) ........................................ 2000-169108

(51) Int. Cl.$^7$ .................................................. F01L 9/04
(52) U.S. Cl. ............................... 123/90.11; 251/129.01; 251/129.15; 251/129.16
(58) Field of Search .................. 123/90.11; 251/129.01, 251/129.15, 129.16; F01L 9/04

(56) References Cited

U.S. PATENT DOCUMENTS

| | | | |
|---|---|---|---|
| 4,614,170 A | | 9/1986 | Pischinger et al. ...... 123/90.11 |
| 5,765,514 A | * | 6/1998 | Sono et al. .............. 123/90.11 |
| 5,934,231 A | * | 8/1999 | Schmitz et al. .......... 123/90.11 |
| 6,269,784 B1 | * | 8/2001 | Newton .................... 123/90.11 |

FOREIGN PATENT DOCUMENTS

| | | |
|---|---|---|
| JP | 9-195736 | 7/1997 |
| JP | 10-288014 | 10/1998 |

OTHER PUBLICATIONS

U.S. patent application Ser. No. 09/860,582, Kumaki et al, filed May 21, 2001.
U.S. patent application Ser. No. 09/764,071, Toriumi, filed Jan. 19, 2001.

* cited by examiner

Primary Examiner—Thomas Denion
Assistant Examiner—Ching Chang
(74) Attorney, Agent, or Firm—Foley & Lardner

(57) ABSTRACT

In an electromagnetically operable engine valve assembly including a controller for an internal combustion engine, a stable initialization is achieved which suppresses a collision of a movable element against an electromagnet to cope with a viscosity of a lubricating oil during an engine start under an engine low temperature. A supplied current value is feedback controlled in accordance with a position of movable element when an initialization control such that a current is continuously supplied to one of electromagnets is executed. At this time, the feedback control gain G1 is, first, set to a relatively small value and is, thereafter, switched to a relatively large value at a gradual pace for each execution of the initialization control until the initialization control has succeeded in moving the movable element to an initial position.

33 Claims, 7 Drawing Sheets

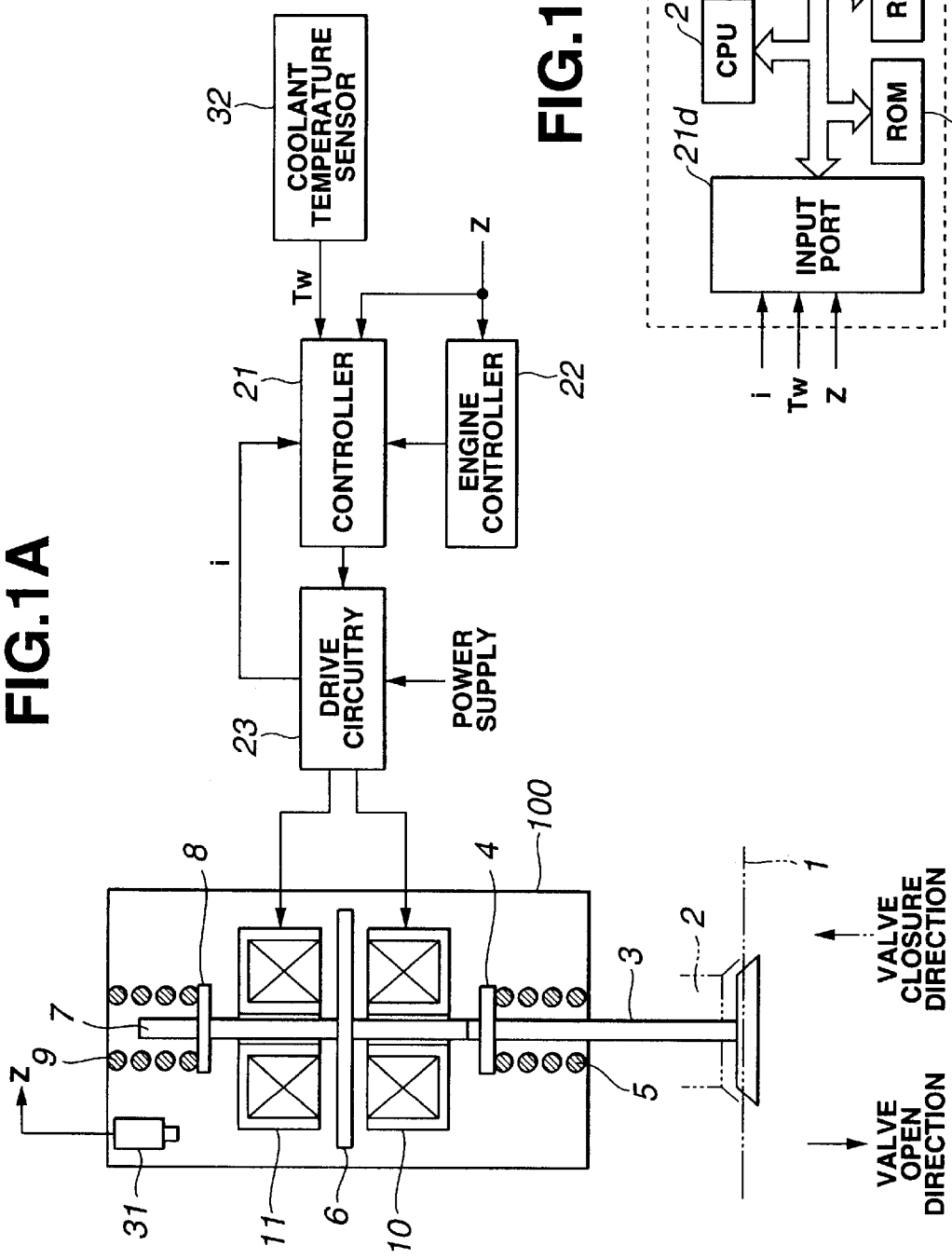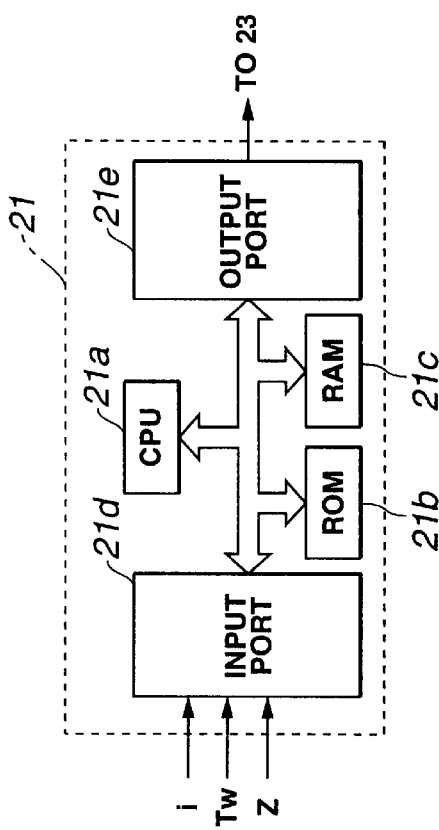

APPARATUS AND METHOD FOR CONTROLLING ELECTROMAGNETICALLY OPERABLE ENGINE VALVE ASSEMBLY

BACKGROUND OF THE INVENTION

1. Field of the Invention

The present invention relates to apparatus and method for controlling an electromagnetically operable engine valve assembly in which a movable element is driven to move through a control over a current flowing through one of a pair of electromagnets. More particularly, the present invention relates to a technology which enables the use of a technique which corresponds to an increase in resistance due to a viscosity of an engine lubricating oil when a position of the movable element is initialized during an engine start under an engine low temperature region so that a collision between the movable element and the electromagnet can stably be suppressed and a contribution to a reduction in a power consumption can be made.

2. Description of the Related Art

Recently, an adoption of the, so-called, electromagnetically operable engine valves as intake and exhaust valves of an internal combustion engine with an electromagnetic actuator as a power device has been discussed.

In this kind of engine valve, such an initialization control that a movable element rested on a neutral position is moved to an initial position (namely, a position corresponding to a valve closure state) is carried out during an engine start.

To achieve the initialization control, such a technique as to utilize a pendulum motion of a spring-mass oscillation system constituting the spring and movable element and to alternatingly supply a power to a pair of electromagnets disposed on upper and lower parts of the movable element at a timing which is coincident with a specific oscillation frequency of the movable element.

According to the above-described technique, the resonance in the oscillation system is induced, the movable element rested is gradually oscillated widely (an amplitude of the oscillation is gradually increased) so that the movable element can be moved to the initial position.

Japanese Patent Application First Publications No. Heisei 9-195736 published on Jul. 29, 1997 and Heisei 10-288014 published on Oct. 27, 1998 exemplify the initialization control described above.

SUMMARY OF THE INVENTION

However, in such a case where the engine is started under the low temperature region (especially, under an extremely low temperature region between −30° C. and −20° C., a viscosity of the engine lubricating oil in a movable section (including the movable element and its surrounding portion) is increased. To perform the initialization utilizing such a pendulum motion as described in the BACKGROUND OF THE INVENTION (hereinafter, referred to as a resonance initialization), a current value for the one of the electromagnets required to develop the resonance initialization becomes remarkably increased.

As described above, the resonance initialization is not only disadvantageous under the engine low temperature region but also may cause the movable element to be landed onto the one of the pair of electromagnets which is energized to attract the movable element at a high velocity since an electromagnetic force acted upon the movable section becomes excessive when a large current is, at the first time, supplied to the attracted side electromagnet if the resonance initialization is tried to be executed even under the low temperature region. Such a violent collision of the movable element against the corresponding electromagnet is a problem to be avoided from the standpoint of vibration, noise, and durability of the movable element and valve body.

To solve such a problem as described above, a software control technique utilizing a detected position information of the movable element to reduce a landing velocity has been proposed.

According to the proposed software control technique, a highly accurate control of the landing velocity can be achieved by using a model constant (for example, mass, friction, and spring constant) related to the electromagnetically operable engine valve which is a controlled system. Thus, the collision of the movable element against each of the electromagnets can be suppressed.

However, it is difficult to always perform a stable control even if such a software control technique as described above is applied to the electromagnetically operable engine valve. This is because a friction (representing a magnitude of a friction force based on a viscosity of the lubricating oil of the movable section) which is the object of the above-described model constant is largely varied in accordance with a temperature variation and its value is uncertain under the low temperature region.

It is, therefore, an object of the present invention to provide control apparatus and method for the electromagnetically operable engine valve which are capable of executing the initialization control which can stably suppress the collision of the movable element against each or one of the pair of electromagnets and can reduce the power consumption as low as possible under the low temperature region which would make it difficult to execute a favorable resonance initialization due to the increase in the viscosity resistance.

According to one aspect of the present invention, there is provided an electromagnetically operable engine valve assembly for an internal combustion engine, comprising: a movable element; a spring element to bias the movable element at a neutral position; an electromagnet unit faced against the movable element; a control apparatus to control a current supplied to the electromagnet unit to drive the movable element so as to regulate a displacement of a valve body associated with the movable element, the control apparatus comprising: an initialization control section that executes an initialization control such that the current is continuously supplied for the electromagnet unit to move the movable element rested at the neutral position to an initial position; a position detector enabled to detect a position of the movable element with respect to the electromagnet unit; a first current supply control section that performs a feedback control of the current supplied to the electromagnet unit during the execution of the initialization control by a feedback control gain on the basis of the position of the movable element detected by the position detector; and a feedback control gain varying section that varies the feedback control gain in such a manner that as the movable element becomes nearer to the initial position, a velocity of the movable element to arrive at the initial position becomes reduced when the initialization control section executes the initialization control repeatedly until the initialization control has succeeded in moving the movable element to the initial position during an engine start.

According to another aspect of the present invention, there is provided an electromagnetically operable engine valve assembly for an internal combustion engine, comprising: a movable element; a pair of springs to bias the movable element at a neutral position; a pair of electromagnets, each electromagnet being faced against the movable element; a control apparatus to control a current supplied to one of the pair of electromagnets to drive the movable element so as to regulate a displacement of a valve body associated with the movable element, the control apparatus comprising: an initialization control section that executes an initialization control such that the current is continuously supplied to one of the pair of electromagnets to move the movable element rested at the neutral position to an initial position; a position detector enabled to detect a position of the movable element with respect to one of the pair of electromagnets; a first current supply control section that performs a feedback control of the current supplied to one of the pair of electromagnets during the execution of the initialization control by a feedback control gain on the basis of the position of the movable element detected by the position detector; and a feedback control gain switching section that switches the feedback control gain in such a manner that as the movable element becomes nearer to the initial position, a velocity of the movable element to arrive at the initial position becomes reduced when the initialization control section executes the initialization control repeatedly until the initialization control has succeeded in moving the movable element to the initial position during an engine start.

According to still another aspect of the present invention, there is provided a method applicable to an electromagnetically operable engine valve assembly in an internal combustion engine, the electromagnetically operable engine valve assembly comprising: a movable element; a spring element to bias the movable element at a neutral position; an electromagnet unit faced against the movable element; and a control apparatus to control a current supplied to the electromagnet unit to drive the movable element so as to regulate a displacement of a valve body associated with the movable element, and the method comprising: executing an initialization control such that the current is continuously supplied for the electromagnet unit to move the movable element rested at the neutral position to an initial position; detecting a position of the movable element with respect to the electromagnet unit; performing a feedback control of the current supplied to the electromagnet unit during the execution of the initialization control by a feedback control gain on the basis of the detected position of the movable element; and varying the feedback control gain in such a manner that as the movable element becomes nearer to the initial position, a velocity of the movable element to arrive at the initial position becomes reduced when executing the initialization control repeatedly until the initialization control has succeeded in moving the movable element to the initial position during an engine start.

This summary of the invention does not necessarily describe all necessary features so that the invention may also be a sub-combination of these described features.

BRIEF DESCRIPTION OF THE DRAWINGS

FIG. 1A is a schematic circuit block diagram of a control apparatus for an electromagnetically operable engine valve in a preferred embodiment according to the present invention.

FIG. 1B is a schematic block diagram of a controller shown in FIG. 1A.

DETAILED DESCRIPTION OF THE PREFERRED EMBODIMENT

Figure 2:
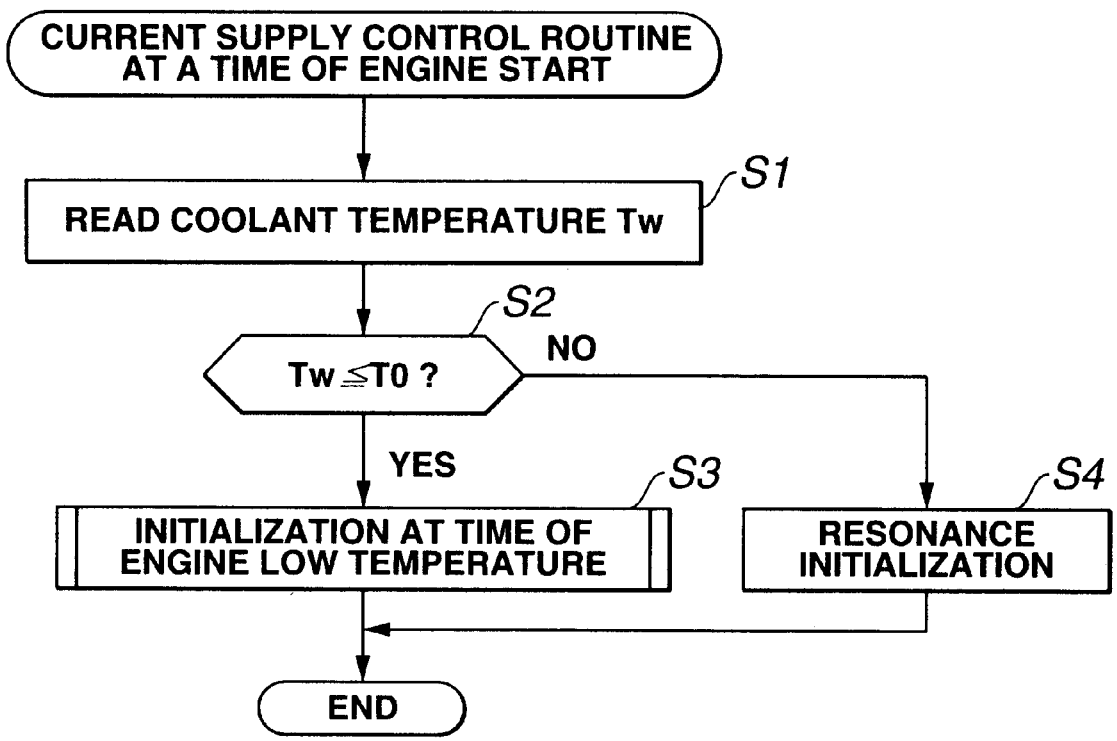
FIG. 2 is an operational flowchart representing a current supply control routine at a time of engine start executed in the control apparatus shown in FIG. 1A.

Reference will hereinafter be made to the drawings in order to facilitate a better understanding of the present invention.

FIG. 1A is a schematic circuit block diagram of a control apparatus for an electromagnetically operable engine valve in a preferred embodiment according to the present invention. The control apparatus for the electromagnetically operable engine valve in the preferred embodiment shown in FIG. 1A is applicable to intake valve and/or exhaust valve of an internal combustion engine.

A port 2 communicated with an intake air passage or exhaust passage of the engine is formed on a cylinder head 1 attached on an upper part of a cylinder block. It is noted that in FIG. 1A, only a single port is shown.

A valve body 3 of the electromagnetically operable engine valve as a controlled system is disposed in port 2 to constitute the intake valve or exhaust valve of the engine.

Valve body 3 is slidably held within cylinder head 1 and guided vertically within cylinder head 1. A retainer 4 is fixed on an upper end of an axle portion of valve body 3. A spring 5 is intervened between a housing wall portion 100 faced against retainer 4 and a valve open direction of port 2 to bias valve body 3 to a valve closure direction.

In addition, a lower end of a guide axle member 7 to which a plate-like member 6 (hereinafter, referred to as a movable element) made of a soft magnetic property material is integrally attached is brought in contact with an upper end of the axle part of valve body 3. Another retainer 8 is fixed on an upper part of the guide axle member 7. Another spring 9 extended between the housing wall portion 100 faced against the port 2 and retainer 8. Consequently, movable element 6 is biased at a valve open direction and, therefore, valve body 3 is biased toward the valve open direction.

Both of valve body 3 and movable element 6 are integrally movable and movable element 6, in the integrated state with the valve body 3, is biased toward a neutral position. The neutral position is defined as an intermediate position between valve full open and full closure positions. It is noted that the axle portion of valve body 3 and guide axle member 7 are not limited to be separate from each other but may be continuing member.

In addition, both valve opening and valve closure electromagnets 10 and 11 are disposed in valve housing 100 against movable element 6 with a predetermined interval of space. Guide axle member 7 is supportably inserted into a guide hole penetrated through valve open and closure electromagnets 10 and 11 so as to be enabled to make a smooth movement along the guide hole. Then, it is preferable that the neutral position of the movable element is set at an approximately center position between valve open electromagnet 10 and valve closure electromagnet 11.

Furthermore, a position sensor 31 to measure a position of movable element 6 is disposed and the position information from the position sensor 31 is outputted to controller 21. The position sensor 31 is constituted by a laser displacement meter in the preferred embodiment and can be disposed within housing 100. A Hall effect device or eddy current sensor may be used as the position sensor. In these alternative cases, such a device as described above may be disposed on upper end of guide axle member 7 to indirectly measure the position of movable element 6 via the guide axle member 7.

A controller 21 has functions as control gain switching section, a first current supply control section, and a second current supply control section. Controller 21 outputs a power supply command to a drive circuitry 23 for one of valve open and valve closure electromagnets 10 and 11 which is the object to be driven during an engine start and outputs the power supply command to the drive circuit on the basis of a valve open or valve closure command issued from an engine controller 22 during a normal engine drive. The drive circuitry 23 supplies a current to one of valve open and closure electromagnets 10 and 11 which is to be driven from a power supply (not shown) in response to the power supply command.

A temperature sensor 32 outputs a temperature indicative signal to controller 21. Temperature sensor 32 can detect a temperature of an engine lubricating oil or that corresponding to the lubricating oil. In the preferred embodiment, the temperature sensor 32 detects an engine coolant temperature Tw as the temperature corresponding to the engine lubricating oil. Controller 21 furthermore receives a power supply current i to each of valve open and closure electromagnets 10 and 11 from drive circuitry 23.

As shown in FIG. 1B, controller 21 includes a microcomputer generally having a CPU 21a (Central Processing Unit), a ROM 21b (Read Only Memory), a RAM 21c (Read Only Memory), Input Port 21d, an Output Port 21, a common bus.

Next, control contents executed by controller 21 will be described below.

As described above, movable element 6 is biased at a neutral position by means of the pair of upper and lower springs 5 and 9 and sizes and spring constants of these springs 5 and 9 are designed so that movable element 6 is rested on an approximately center of these electromagnets with a power supply turned off state to both of valve open and closure electromagnets 10 and 11.

During the engine start, a engine start purpose current supply control is carried out for a predetermined electromagnet (either of valve open or valve closure electromagnet 10 or 11) to be driven so that the movable element 6 rested on a neutral position is driven to move. Then, movable element 6 is positioned at a predetermined initial position (in the preferred embodiment, a landed position of the valve closure electromagnet 11) to initialize the position of movable element 6. At this time, movable element 6 is initialized and its state is maintained until the engine start is completed.

FIG. 2 shows an operational flowchart representing the control contents by controller 21 at the time of engine start. According to the current supply control based on the flowchart, the above-described initialization can be achieved. Hereinafter, the operational flowchart shown in FIG. 2 will be described below.

At a step S1 (step is, hereinafter, abbreviated simply as S, controller 21 reads the coolant temperature Tw.

At S2, controller 21 determines whether the read temperature Tw is equal to or below a predetermined value To to select the control contents of the initialization.

If the controller 21 determines that the read temperature Tw is equal to or below the predetermined value To (Tw≦To), the routine goes to S3 to select the low temperature initialization. If No (Tw>To) at S2, the routine goes to a S4 at which the resonance initialization is carried out. The predetermined value To is a value representing a boundary between an ordinary temperature region and a low temperature region and, for example, −10° C. although the value is dependent on a kind (quality) of the used lubricating oil.

If controller 21 selects the resonance initialization at S4, each of valve open and closure electromagnets 10 and 11 receives alternatingly the current supply at a period corresponding to a specific oscillation frequency of a spring mass oscillation system constituted by a movable section including the springs 5 and 9, valve body 3, and guide axle member 7. Therefore, the resonance of this oscillation system is induced, an amplitude of movable element 6 is gradually increased, and the movable element 6 can soon be reached to the initial position.

On the other hand, controller 21 selects the low temperature purpose initialization at S3. In this case, the alternative current supplying method is not carried out but a continuous current supply to valve closure electromagnet 11 is carried out. As described above, at a low temperature region, the friction becomes large so that a considerable electromagnetic force is required to drive movable element 6 rested. Then, if after movable element 6 started to be moved and a constant quantity of current is supplied, movable element 6 is gradually accelerated and may violently collide against valve closure electromagnet 11.

Figure 3:
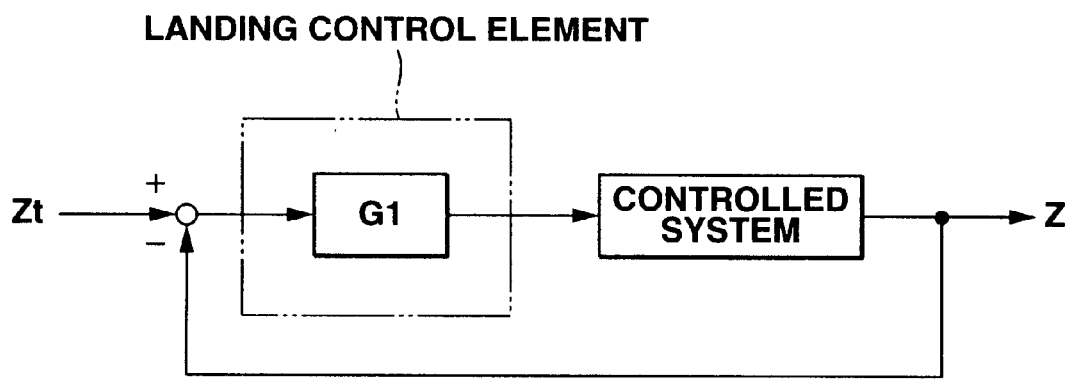
FIG. 3 is a schematic control block diagram of the control apparatus shown in FIG. 1A.

To avoid such a phenomenon, during the initialization at the time of engine low temperature, a deceleration of movable element 6 before the landing is achieved. The current supplied to valve closing electromagnet 11 is feedback controlled as a control gain G1 on the basis of position information from position sensor 31 (refer to FIG. 3).

However, under the low temperature region, the magnitude of friction is not certain. Since it is difficult to set the control gain G1 which is always most appropriate. Hence, a dynamic setting of the feedback control gain G1 is carried out to avoid excessive setting. Hereinafter, the control contents of low temperature initialization will be described in details with reference to the flowchart of FIG. 5.

At S11, controller 21 sets a control gain G1 (feedback control gain). The control gain G1 is, at the first time, set to an initial value $G1_1$ which is relatively small. The current supply current flowing through valve closure electromagnet 11 is feedback controlled through the control gain $G1_1$ on the basis of the contents of the subsequent steps.

If the set control gain $G1_1$ is too small to develop a sufficient electro-magnetic force so that movable element 6 remains rested or does not reach to the initial position although the movement is started, the routine returns to S11 to again set the control gain G1.

The setting of control gain G1 can be carried out in accordance with a rule described in the following equation:

$$G1_n = G1_{n-1} + \Delta G \tag{1}$$

wherein $G1_{n-1}$ denotes a control gain previously set at this step and $\Delta G$ denotes a predetermined gain increment. S11 corresponds to gain switching section. It is noted that the initial value $G1_1$ may be set to zero.

At S12, controller 21 read a position z of movable element 6. At S13, controller 21 calculates a target position $Z_t$ of movable element 6. The target position $Z_t$ can arbitrarily be set as a function based on an elapse time t after the start of current supply. For example, a variation rate of target position $z_t$ is gradually reduced from an appropriate timing after the power supply start. Consequently, the deceleration of movable element is achieved to suppress the collision of movable element 6 against valve closure electromagnet 11.

At S14, controller 21 adds a feedback correction current formed by a multiplication of the control gain G1 with a deviation of $(z_t-z)$ between target position zt of movable element 6 and actual position z to an actual current I to device a target current i* to be supplied to valve closure electromagnet 11.

At S15, controller 21 controls drive circuitry 23 to supply target current i* to the corresponding electromagnet 10 or 11. Consequently, a counter electromotive force is generated on the corresponding electromagnet 10 or 11 along with a movement of movable electrode 6 to determine a current to be actually supplied to this electromagnet. An attracting force f of the corresponding electromagnet is acted upon movable element 6 in accordance with the actual current and position z of movable element 6 and movable element 6 is driven toward initial position against the spring force of the springs 5 and 9.

S12 through S15 correspond to first current supply control section. At S16, controller 21 determines if a reverse return of movable element 6 to the neutral position is detected. This step serves to detect a state in which since the control gain G1 set at S11 is so small that a sufficient electromagnetic force to follow the target position $z_t$ and elasticity of both springs 5 and 9 causes movable element 6 to return to the neutral position direction Hence, for example, with velocity v of movable element 6 derived and the reverse turn is detected when the velocity v indicates a negative value with respect to the forwarding direction. Such a reverse turn detection of movable element 6 as described above can detect a failure in the initialization control. Hence, S16 can constitute determining section to determine if the initialization has succeeded.

In a case where the reverse turn of movable element 6 is detected (Yes) at S16, the routine goes to S17. At S17, controller 21 turns off the power supply to valve closure electromagnet 11. Then, the routine goes to S11. That is to say, the oscillation of movable element 6 is stopped and is rested, and, thereafter, control gain G1 is switched in accordance with the above equation (1), and the initialization control process of S12 through S15 is again executed.

Figure 4:
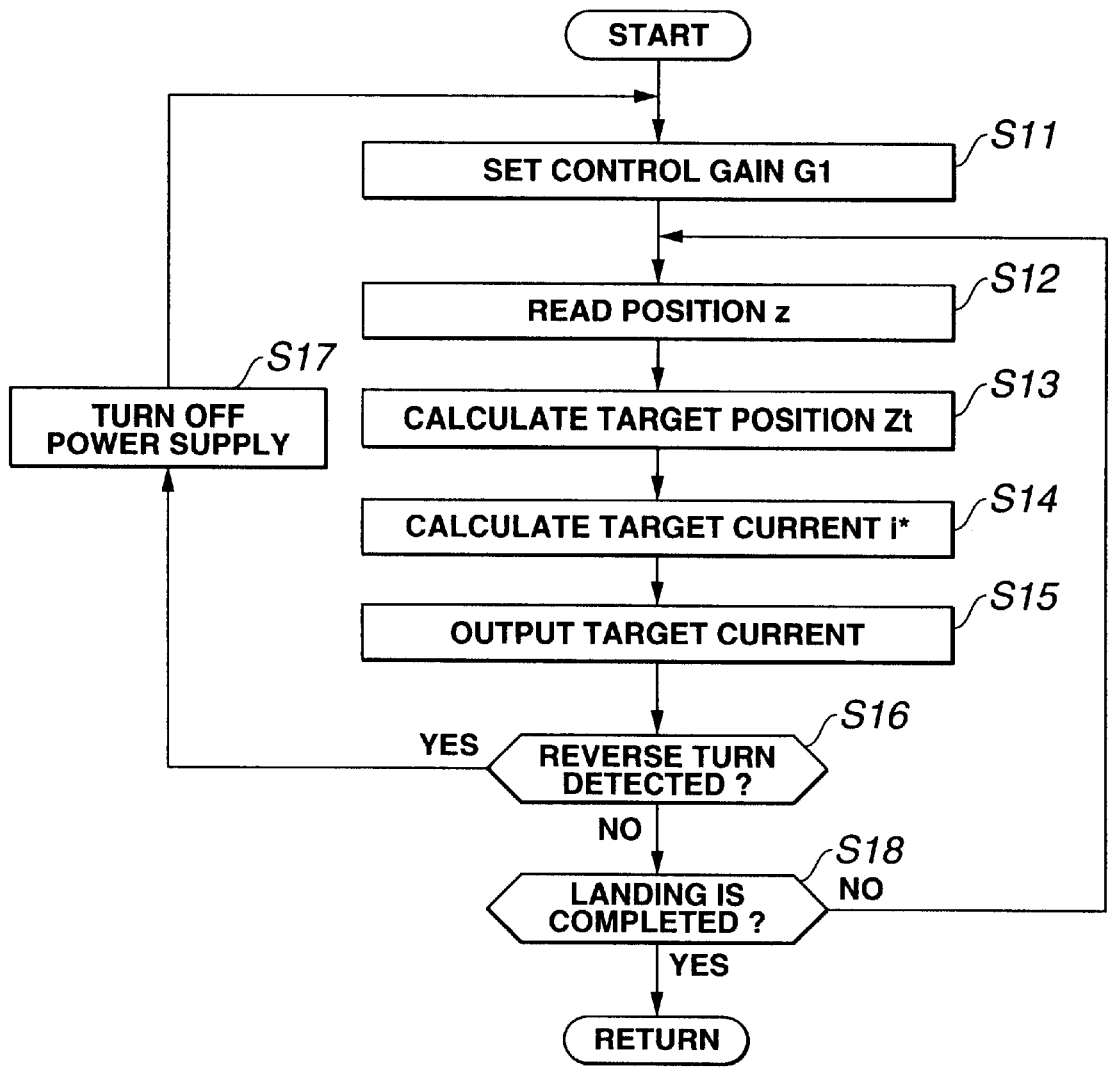
FIG. 4 is an operational flowchart representing an example of an initialization routine at a time of engine low temperature executed in the control apparatus.

On the other hand, if the reverse turn of movable element 6 is not detected (No) at S16, the routine goes to S18. At S18, controller 21 determines whether movable element 6 has reached to the initial position and the landing is completed. If movable element 6 is in a midway through stroke, the routine returns to S12 to continue the initialization control process using the same control gain G1. If the landing is completed (Yes) at S18, the present routine shown in FIG. 4 is returned and its state is maintained until the engine start is completed.

Figure 5:
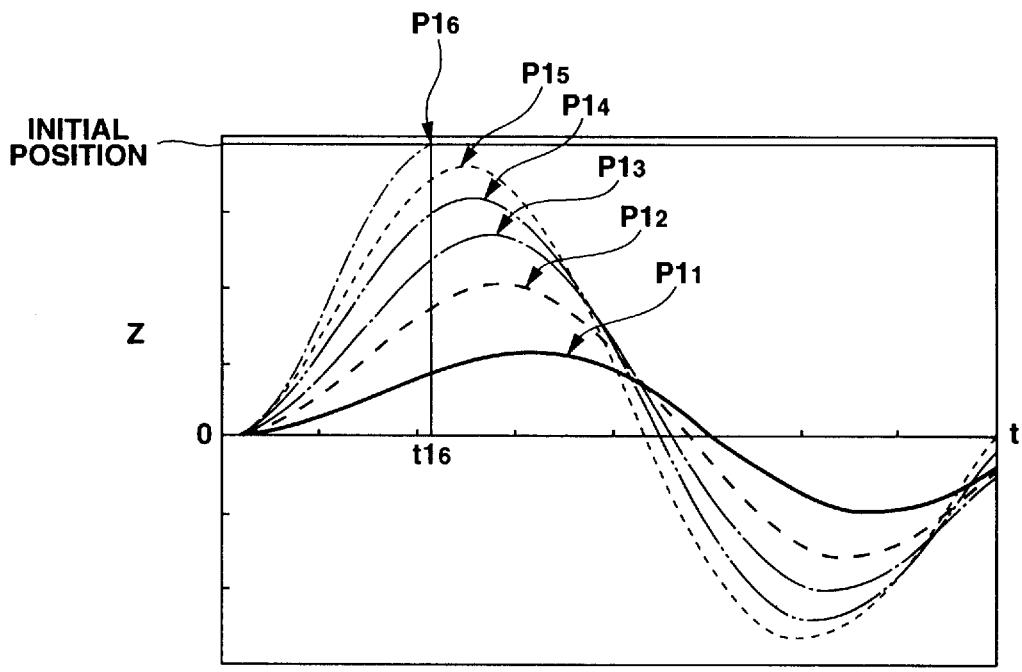
FIG. 5 is a diagram representing trajectories of a movable element as a result of execution of an example of the initialization routine at the time of engine low temperature shown in FIG. 4.

FIG. 5 shows trajectories of movable element 6 when the above described current supply control routine during the engine low temperature is executed. The control gain G1 is, in accordance with the above equation (1), augmented by a constant quantity for each execution of the initialization control from the initial value $G1_1$ which is relatively small value. As a result of this, a peak point $Pl_n$ (substantially equal to the reverse turn point described above) of the displacement of movable member 6 approaches gradually to the initial position from the peak point P11 in the case where the control gain G11 is executed at the first time as the number of times the initialization is executed are increased. By a sixth number of times the initialization is carried out, movable element 6 is landed onto the corresponding electromagnet upon an elapse of a time $t_{16}$ from a time at which the start of power supply is executed so that the initialization has been achieved.

In the embodiment, according to the setting rule described in the above equation (1), the initialization upon the start of engine can be achieved for an appropriate time duration. However, the present invention is not limited to this but the control gain G1 may be set at a different variation rate for each execution of the initialization control. For example, in the setting rule described in the following equation (2), the control gain G1 can be set in accordance with an un-arrival distance $d_{n-1}$ to the initial position of movable element 6 which is caused by the previously executed initialization control. The un-arrival distance corresponds to the distance that movable element remains to travel from its current position to the initial position (see e.g., $d_1$ in FIG. 6). In the equation (2), α denotes a constant.

That is to say, $$G1_n = G1_{n-1} + \alpha \cdot d_{n-1} \tag{2}$$

That is to say, $$G1_n = G1_{n-1} + \alpha \cdot d_{n-1} \tag{2}$$

Figure 6:
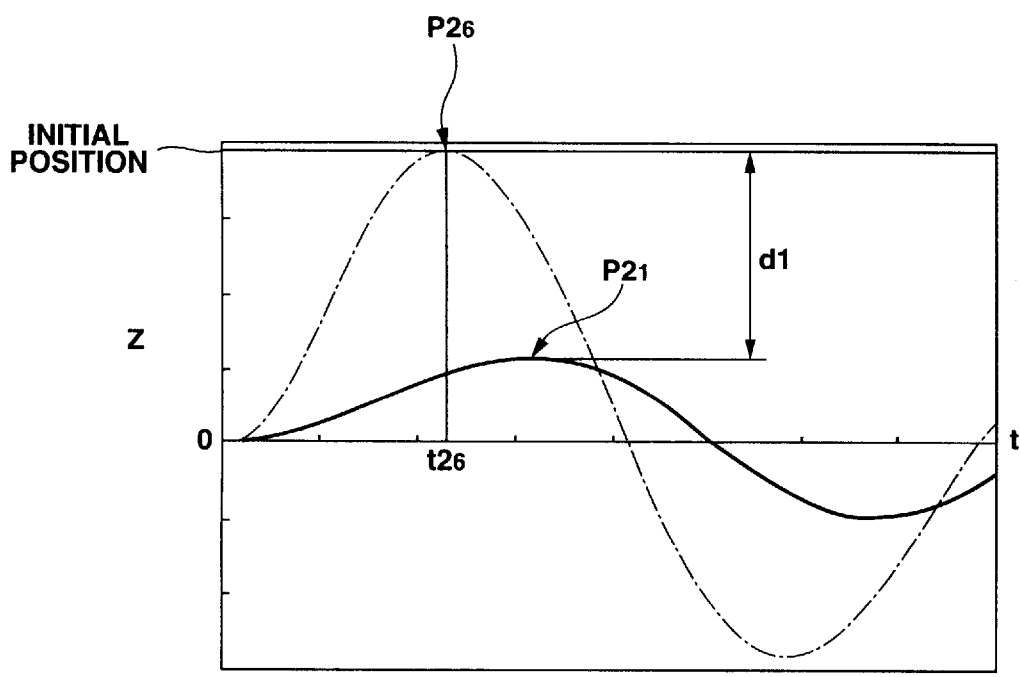
FIG. 6 is a diagram representing trajectories of the movable element as a result of execution of another example of the initialization routine at the time of engine low temperature than that shown in FIG. 4.

FIG. 6 shows the trajectory of movable element 6 in accordance with the above equation (2). Movable element 6 returned with the un-arrival distance $d_1$ left by means of the initialization control at the control gain $G1_1$, which is relatively small arrives at the close proximity to the initial position in accordance with the control gain $G1_2$ set in accordance with the above described rule described in the equation (2) (for convenient purpose, the trajectories by the second through fifth number of times the execution of initialization is carried out are not shown in FIG. 6). According to the sixth number of executions, movable element 6 is landed after the elapse of time $t2_6$ from the time at which the power supply is started.

The control gain G1 may be switched to the value based on the number of times the initialization controls have been executed. For example, the control gain G1 may be a value which accords with the magnitude of a square root based on the number of executions n (namely, f(n)). For example, as shown in the following equation (3), a square root of the execution number of times n is taken as f(n)=n by which a constant β is multiplied so that the control gain G1 may approximately be set.

That is to say, $$G1_n = \beta \cdot n^{1/m} \quad (3).$$

Figure 7:
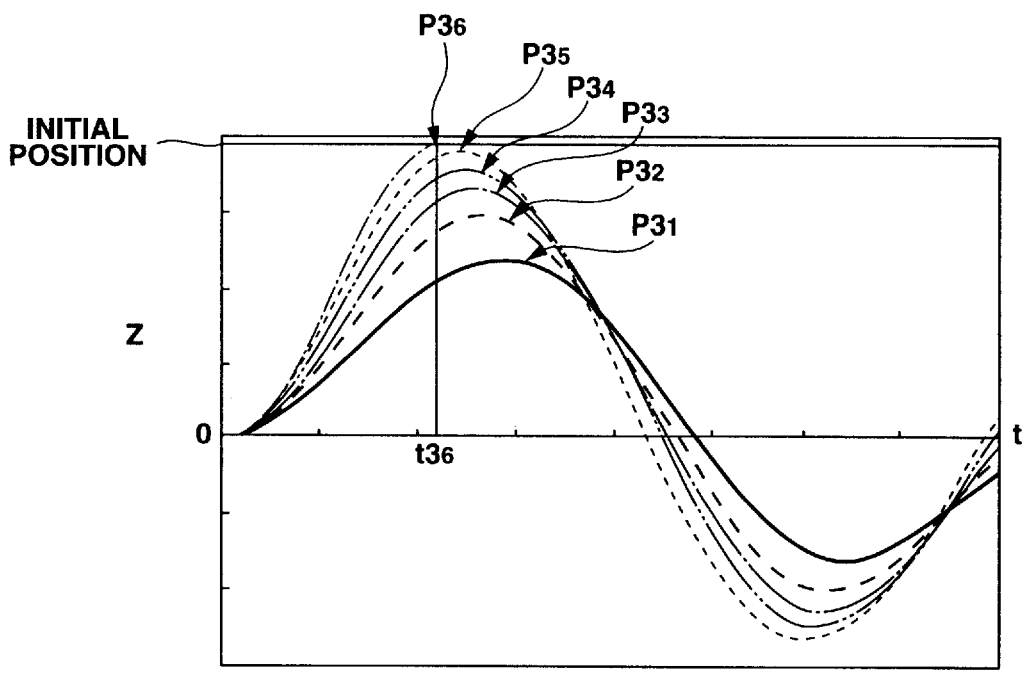
FIG. 7 is a diagram representing trajectories of the movable element as a result of execution of the initialization routine at the time of engine low temperature in the case of a still another example of the initialization routine than that shown in FIG. 4.

FIG. 7 shows the trajectories of movable element 6 in a case where m=2 (namely, $G1_n = \beta \times n^{1/2}$) in accordance with the following equation (3).

As compared with the case in accordance with equation (1) (refer to FIG. 5), control gain G1 is set to a relatively large value at an earlier stage and is converged into a constant maximum value whenever the number of times the executions n have been increased. Hence, movable element 6 can reach to the proximity to the initial position from the first time execution (peak point $P3_1$) and, from the peak point $P3_1$, movable element 6 can gradually be converged into the initial position. Hence, FIG. 7 indicates that the initialization has been completed according to the sixth-number execution. However, if a constant β and function f(n) are approximated, it is possible to achieve the initialization at a less number of executions. If the number of times the executions of initializations are set to be constant, a more smooth landing of movable element 6 can finally be achieved.

Furthermore, control gain G1 may be a value which accords with a magnitude of a logarithm on a value (namely, g(n)) based on the number of times executions of initializations are carried out. For example, as described in the following equation (4), g (n)=n+1, a logarithm of a value to which 1 is added is taken, and a constant ε is multiplied by the logarithm.

That is to say, $$G1_n = \epsilon \times \log_a(n+1) \quad (4).$$

Figure 8:
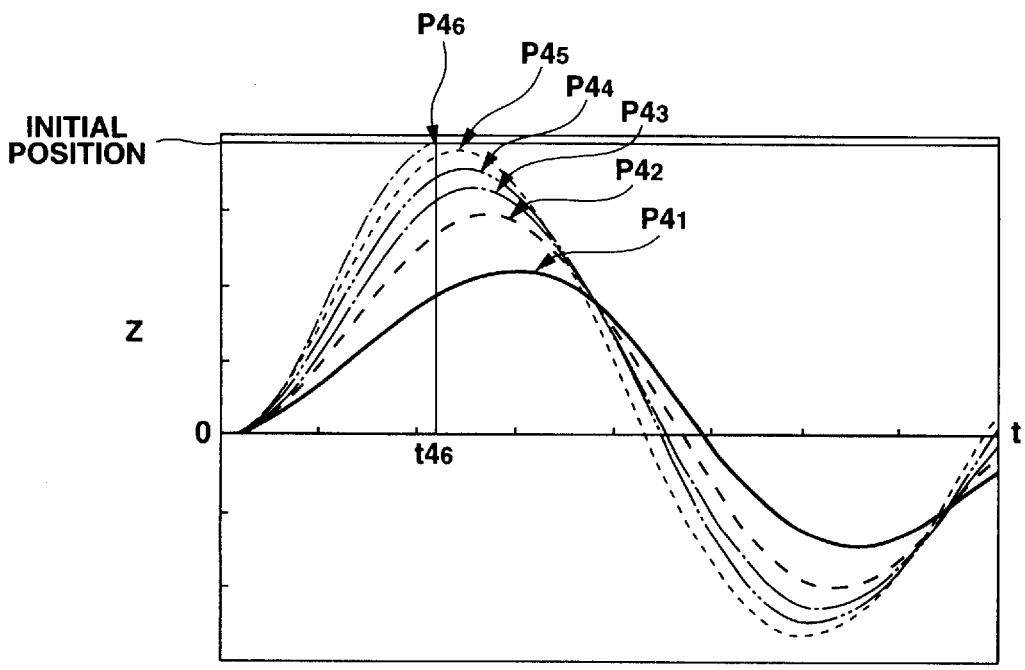
FIG. 8 is a diagram representing trajectories of the movable element as a result of execution of the initialization routine at the time of engine low temperature in the case of a further another example of the initialization routine than that shown in FIG. 4.

FIG. 8 shows trajectories of movable element 6 in the case where the control gain G1 is in accordance with equation (4), a base a is set to e (e=1+1/1!+1/2!+1/3!+ - - - = 2.71828 - - - ), and $G1_n = \epsilon \times \ln(n+1)$. In the same case (refer to FIG. 7) as the above equation (3), control gain G1 is set to a relatively large value at an earlier stage. Whenever the number of times the executions of initializations n are increased, the control gain G1 is converged into the constant maximum value. Consequently, to make constant ε and function g(n) more appropriate, the number of times the executions of initializations are carried out can be reduced and the smooth landing of movable element 6 can be achieved.

As described above, the initialization can be completed and, when the engine start is completed, the engine is transferred to the normal engine drive.

Figure 9:
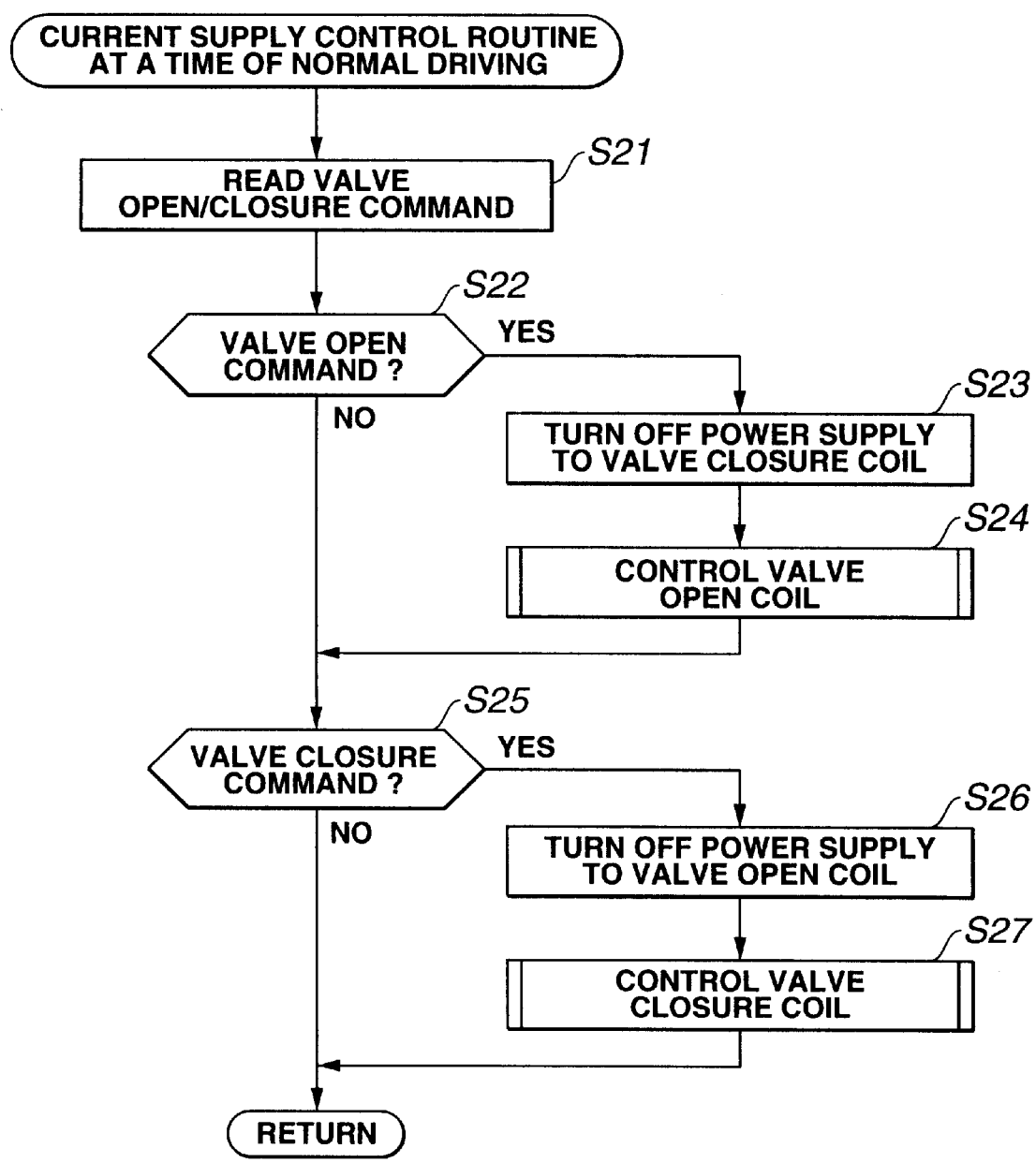
FIG. 9 is an operational flowchart of a current supply control routine at a time of normal engine drive executed by the control apparatus for the electromagnetically operable engine valve in the preferred embodiment shown in FIG. 1A.

FIG. 9 shows an operational flowchart representing the control contents by controller 21 during the normal engine drive. The power supply control based on the flowchart of FIG. 9 drives the intake valve or the exhaust valve so that a gas exchange can favorably be achieved. The detailed explanation of the flowchart shown in FIG. 9 will be hereinafter made.

At S21, controller 21 reads valve open or valve closure command on the intake or exhaust valve from the engine controller 22.

At S22, controller 21 determines whether the read command indicates the valve open command. If Yes (valve open command) at S22, the routine of FIG. 9 goes to S23. If No (not valve open command) at S22, the routine jumps to S25.

At S23, controller 21 turns off the power supply to valve closure electromagnet 11. Although movable element 6 displaces in the lower direction as viewed from FIG. 1A due to the elasticity of both springs 5 and 9, an energy loss is developed due to an effect of the friction on the oscillation system during the stroke of movable element. Therefore, at S24, controller 21 supplies the power to valve open electromagnet 10 in a midway through the stroke so as to assist energizing a motion of movable element 6 by means of electromagnetic force. If the supplied current is maintained constant, movable element 6 is accelerated as movable element approaches to the attracted side electromagnet and these elements of movable element 6 and the attracted side electromagnet may collide against each other. Hence, the deceleration of movable element 6 is carried out before movable element 6 lands onto the attracted side electromagnet. To achieve this object, the feedback control utilizing the positional information related to movable element 6 can be applied.

Figure 10:
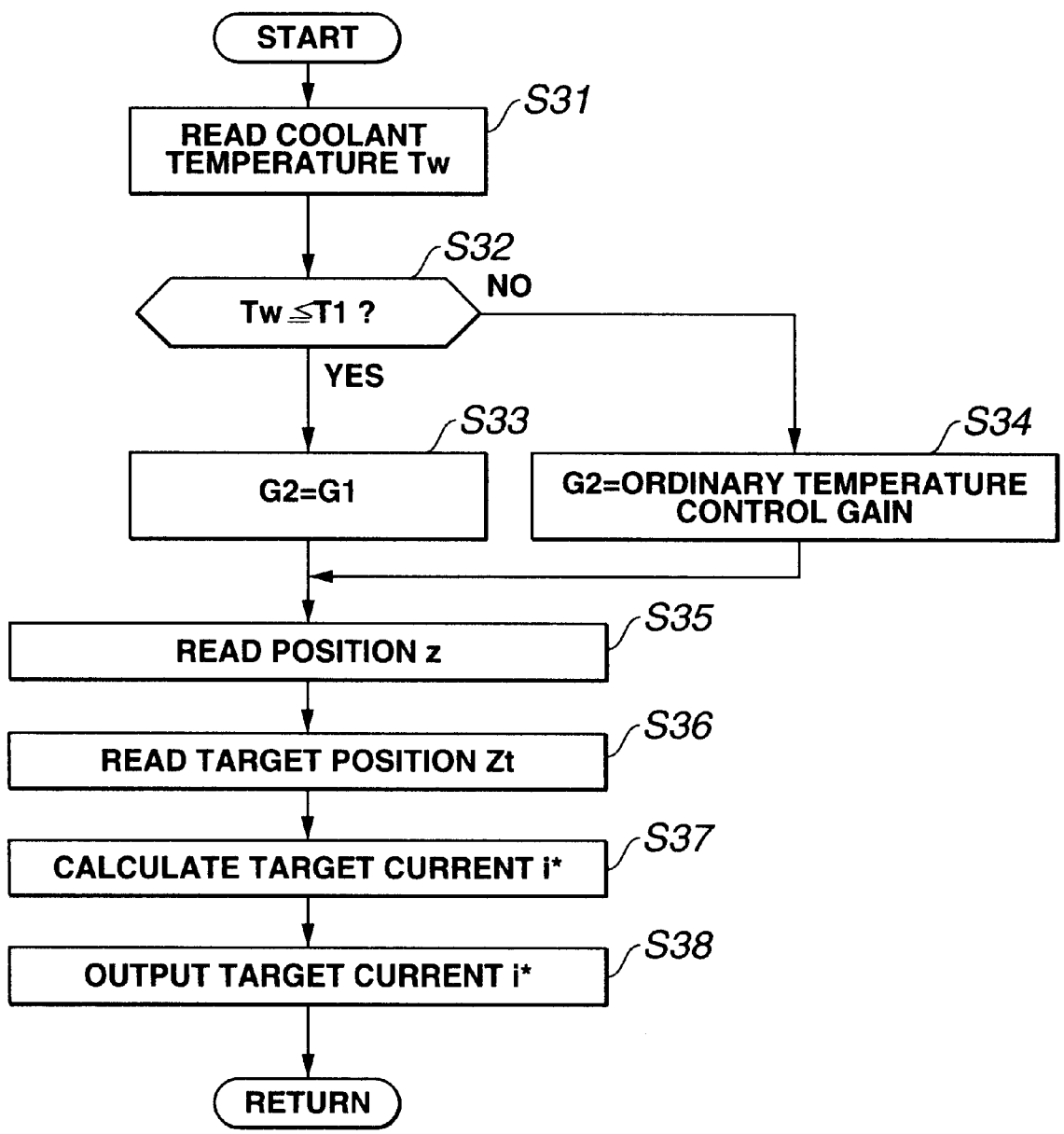
FIG. 10 is an operational flowchart representing one example of a landing control routine at the time of a normal (ordinary) engine drive.

FIG. 10 shows a detailed operational flowchart at S24 shown in FIG. 9.

That is to say, at S31, controller 21 reads the coolant temperature Tw.

At S32, controller 21 determines whether the read coolant temperature Tw is equal to or below a predetermined value T1 (for example, −10° C.), namely, whether the engine is presently within a low temperature region. It is noted that although, in the embodiment, the predetermined value T1 is set to be equal to the predetermined value To described above, the present invention is not limited to this condition but the predetermined value T1 may be set to another more appropriate value. If the engine falls in the low temperature region (namely, Tw≦T1), the routine goes to S33. At S33, controller 21 sets control gain G2 to G1 by which the initialization control has succeeded ($G1_6$ in the case of FIG. 6). On the other hand, if the engine does not fall in the low temperature region (No) at S32, the routine jumps to S34 at which control gain G2 is set to a value prepared for an ordinary temperature application.

Since the contents of S35 through S38 may be the same as those of S12 through S15.

Referring back to FIG. 9, if the command from engine controller 22 is determined not the valve open command (No), the routine goes to S25. At S25, controller 21 determines whether the read command is the valve closure command. If controller 21 determines that the read command is the valve closure command, the routine goes to SS26. If No at S25, the present routine shown in FIG. 9 is returned. At S26, controller 21 turns off the power supply to valve open electromagnet 10. At S26, controller 21 turns off the power supply to valve open electromagnet 10. At S27, the same control as that at S24 (specifically, S31 through S37) are carried out for valve closure electromagnet 11.

It is noted that S34 through S37 correspond to a second current supply control section.

As described hereinabove, in the initialization control during the engine start in the preferred embodiment, the power supply current is feedback controlled and the setting of the excessively large control gain G1 can be avoided. Hence, movable element 6 can be driven by the appropriate electromagnetic force. As movable element 6 becomes approached to the attracted side electromagnet, the deceleration of movable element can be carried out. Therefore, the stable initialization even under the low temperature region can be achieved and the power consumption can be suppressed at minimum.

In addition, since control gain G1 when the initialization has succeeded is set continuously until the engine temperature becomes ordinary temperature, a reliable control gain G2 can effectively be carried out and the control apparatus for the electromagnetically operable engine valve can contribute to the minimization of the reductions of noise and power consumption.

It is noted that each of the pair of electromagnets 10 and 11 includes a coil portion and a magnetic core portion, both portions being formed about guide axle member 7 in a bobbin form and surfaces thereof being faced against movable element 6, each of the pair of electromagnets 10 or 11 on which movable element 6 is attracted and moved is constituted by an electromagnet unit defined in the claims, the engine lubricating oil is circulated in housing 100 shown in FIG. 1A, an electromagnetically operable engine valve assembly includes the control apparatus described above, and engine valve body 3 shown in FIG. 1A indicates the neutral position.

The entire contents of a Japanese Patent Application No. 2000-169108 (filed in Japan on Jun. 6, 2000) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. An electromagnetically operable engine valve assembly for an internal combustion engine, comprising:
    a movable element;
    a spring element to bias the movable element at a neutral position;
    an electromagnet unit faced against the movable element;
    a control apparatus to control a current supplied to the electromagnet unit to drive the movable element so as to regulate a displacement of a valve body associated with the movable element, the control apparatus comprising:
        an initialization control section that repeatedly executes an initialization control such that the current is supplied for the electromagnet unit to move the movable element rested at the neutral position to an initial position;
        a position detector enabled to detect a position of the movable element with respect to the electromagnet unit;
        a first current supply control section that performs a feedback control of the current supplied to the electromagnet unit during the execution of the initialization control by a feedback control gain; and
        a feedback control gain varying section that varies the feedback control gain for each execution of the initialization control.

2. An electromagnetically operable engine valve assembly for an internal combustion engine as claimed in claim 1, wherein the feedback control gain varying section comprises a feedback control gain switching section that switches the feedback control gain from an initial value near to zero or zero gradually to a value larger than the initial value and to a degree such as to decelerate and land the movable element onto the electromagnet for each execution of initialization control by the initialization control section until the initialization control has succeeded in moving the movable element to the initial posiiton.

3. An electromagnetically operable engine valve assembly for an internal combustion engine as claimed in claim 1, wherein the initialization control section executes the initialization control during the engine start under a temperature of the engine lower than a predetermined value.

4. An electromagnetically operable engine valve assembly for an internal combustion engine as claimed in claim 3, wherein the control apparatus further comprises a second current supply control section that executes the feedback control for the current supplied to the electromagnet during an ordinary drive of the engine on the basis of the position of the movable element detected by the position detector and wherein the feedback control gain set in the first current supply control section is set in the second current control section until the engine temperature indicates an ordinary temperature.

5. An electromagnetically operable engine valve assembly for an internal combustion engine as claimed in claim 2, wherein the feedback control gain switching section switches the feedback control gain to be incremented by a constant quantity.

6. An electromagnetically operable engine valve assembly for an internal combustion engine as claimed in claim 1, wherein the feedback control gain varying section comprises a feedback control gain switching section that switches the feedback control gain in such a manner that an increment rate of the feedback control gain is gradually decreased as the initialization control is executed.

7. An electromagnetically operable engine valve assembly for an internal combustion engine as claimed in claim 6, wherein the feedback control gain is increased in accordance with an un-arrival distance to the initial position of the movable element by a previously proposed initialization control.

8. An electromagnetically operable engine valve assembly for an internal combustion engine as claimed in claim 6, wherein the feedback control gain is increased in accordance with the initial position of the movable element by a previously executed initialization control.

9. An electromagnetically operable engine valve assembly for an internal combustion engine as claimed in claim 6, wherein the feedback control gain is increased in accordance with a magnitude of a logarithm of a value based on the number of times the initialization control has been executed.

10. An electromagnetically operable engine valve assembly for an internal combustion engine as claimed in claim 1, wherein the spring element comprises a pair of springs, one of the pair of springs biasing the movable element toward a valve open direction and the other of the pair of springs biasing the movable element toward a valve closure direction, the electromagnet unit comprises a pair of valve open and valve closure electromagnets, the movable element being intervened between the pair of valve open and valve closure electromagnets, and wherein the initial position of the movable element at which the movable element is to be moved during the execution of the initialization corresponds to a position of one of the pair of valve open and valve closure electromagnets at which the movable element is attracted and landed.

11. An electromagnetically operable engine valve assembly for an internal combustion engine as claimed in claim 10, further comprising a coolant temperature sensor to detect a coolant temperature of the engine, wherein the controller further comprises a first determining section to determine whether the detected coolant temperature is equal to or below a predetermined value of temperature, and wherein the initialization control section executes the initialization control according to a result of determination that the detected coolant temperature is equal to or below the predetermined value of temperature.

12. An electromagnetically operable engine valve assembly for an internal combustion engine as claimed in claim 11, wherein the control apparatus further comprises a second determining section that determines if the movable element is returned to the neutral position on the basis of the detected position of the movable element and wherein the feedback control gain varying section varies the feedback control gain $G1_n$ as follows: $G1_n = G1_{n-1} + \Delta G$, wherein $G1_{n-1}$ denotes a previously set feedback control gain and $\Delta G$ denotes a predetermined gain increment according to a result of determination by the second determining section that the movable element is returned to the neutral position.

13. An electromagnetically operable engine valve assembly for an internal combustion engine as claimed in claim 11, wherein the control apparatus further comprises a second determining section that determines if the movable element is returned to the neutral position on the basis of the detected position of the movable element and wherein the feedback control gain varying section varies the feedback control gain $G1_n$ as follows: $G1_n = G1_{n-1} + \alpha \cdot d_{n-1}$, wherein $\alpha$ denotes a constant and $d_{n-1}$ denotes a previous un-arrival distance, according to a result of determination by the second determining section that the movable element is returned to the neutral position.

14. An electromagnetically operable engine valve assembly for an internal combustion engine as claimed in claim 11, wherein the control apparatus further comprises a second determining section that determines if the movable element is returned to the neutral position on the basis of the detected position of the movable element and wherein the feedback control gain varying section varies the feedback control gain $G1_n$ as follows: $G1_n = \beta \times n^{1/m}$, wherein $\beta$ denotes a constant, n denotes the number of times the initialization control has been executed, and m denotes a constant, according to a result of determination by the second determining section that the movable element is returned to the neutral position.

15. An electromagnetically operable engine valve assembly for an internal combustion engine as claimed in claim 11, wherein the control apparatus further comprises a second determining section that determines if the movable element is returned to the neutral position on the basis of the detected position of the movable element and wherein the feedback control gain varying section varies the feedback control gain $G1_n$ as follows: $G1_n = \epsilon \times \log_a(n+1)$, wherein $\epsilon$ denotes a constant, and n denotes the number of times the initialization control has been executed according to a result of determination by the second determining section that the movable element is returned to the neutral position.

16. An electromagnetically operable engine valve assembly for an internal combustion engine as claimed in claim 15, wherein the feedback control gain varying section varies the feedback control gain $G1_n$ as follows: $G1_n = \epsilon \times \ln(n+1)$ according to a result of determination by the second determining section that the movable element is returned to the neutral position.

17. An electromagnetically operable engine valve assembly for an internal combustion engine, comprising:
a movable element;
a pair of springs to bias the movable element at a neutral position;
a pair of electromagnets, each electromagnet being faced against the movable element;
a control apparatus to control a current supplied to one of the pair of electromagnets to drive the movable element so as to regulate a displacement of a valve body associated with the movable element, the control apparatus comprising:
an initialization control section that repeatedly executes an initialization control such that the current is supplied to one of the pair of electromagnets to move the movable element rested at the neutral position to an initial position;
a position detector enabled to detect a position of the movable element with respect to one of the pair of electromagnets;
a first current supply control section that performs a feedback control of the current supplied to one of the pair of electromagnets during the execution of the initialization control by a feedback control gain; and
a feedback control gain switching section that switches the feedback control gain for each execution of the initialization control.

18. A method applicable to an electromagnetically operable engine valve assembly in an internal combustion engine, the electromagnetically operable engine valve assembly comprising:
a movable element;
a spring element to bias the movable element at a neutral position;
an electromagnet unit faced against the movable element; and
a control apparatus to control a current supplied to the electromagnet unit to drive the movable element so as to regulate a displacement of a valve body associated with the movable element, and the method comprising:
repeatedly executing an initialization control such that the current is supplied for the electromagnet unit to move the movable element rested at the neutral position to an initial position;
detecting a position of the movable element with respect to the electromagnet unit;
performing a feedback control of the current supplied to the electromagnet unit during the execution of the initialization control by a feedback control gain; and
varying the feedback control gain for each execution of the initialization control.

19. A valve control apparatus for an engine comprising:
an electromagnetic valve unit having a movable element aligned with a valve, a spring biasing the movable element at a neutral position, and an electromagnet attracting the movable element to displace the valve; and
a controller configured to perform an initialization control repeatedly until the movable element reaches an initial position from the neutral position, each initialization control controlling current to be supplied to the electromagnet based on a control gain, the control gain increasing as the initialization control is repeated.

20. A valve control apparatus as claimed in claim 19, wherein the current to be supplied to the electromagnet in each initialization control is determined based on the control gain and a position of the movable element.

21. A valve control apparatus as claimed in claim 19, wherein the current to be supplied to the electromagnet in each initialization control is determined based on the control gain and a deviation between a target position of the movable element and an actual position of the movable element.

22. A valve control apparatus as claimed in claim 19, wherein the current to be supplied to the electromagnet in each initialization control is determined based on a feedback correction amount formed by a multiplication of the control gain with a deviation between a target position of the movable element and an actual position of the movable element.

23. A valve control apparatus as claimed in claim 19, wherein the initialization control is performed when temperature of the engine is lower than a predetermined value.

24. A valve control apparatus as claimed in claim 19, wherein an ordinary drive is performed after completion of the initialization control, the ordinary drive controls the current to be supplied to the electromagnet based on the control gain set in the initialization control.

25. A valve control apparatus as claimed in claim 19, wherein an ordinary drive is performed after completion of the initialization control, the ordinary drive controls the current to be supplied to the electromagnet based on the control gain set in the initialization control up to a time when temperature of the engine indicates an ordinary temperature.

26. A valve control apparatus as claimed in claim 19, wherein the control gain increases by incrementing a constant quantity as the initialization control is repeated.

27. A valve control apparatus as claimed in claim 19, wherein the increment rate of the control gain decreases as the initialization control is repeated.

28. A valve control apparatus as claimed in claim 19, wherein the control gain is determined in accordance with an un-arrival distance to the initial position of the movable element in the previous initialization control.

29. A valve control apparatus as claimed in claim 19, wherein the control gain is determined in accordance with a value of a logarithm based on a number of times the initialization control has been performed.

30. A valve control apparatus as claimed in claim 19, wherein the current is continuously supplied to the electromagnet in each initialization control.

31. A valve control apparatus as claimed in claim 19, wherein the initial position is a landed position to the electromagnet.

32. A valve control apparatus for an engine comprising:
an electromagnetic valve unit having a movable element aligned with a valve, a pair of springs biasing the movable element at a neutral position, and a pair of electromagnets attracting the movable element to displace the valve; and
a controller configured to:
perform an initialization control repeatedly, until the movable element reaches an initial position from the neutral position, when an engine coolant temperature is equal to or below a predetermined value, wherein the initialization control being performed by supplying a current continuously to the one of electromagnets, the current to be supplied to the one of electromagnets being determined on the basis of a control gain, the control gain increasing as the initialization control is repeated.

33. A valve control apparatus as claimed in claim 32, the controller further configured to perform a resonance initialization control so as to cause the movable element to reach the initial position from the neutral position, when the engine coolant temperature is greater than the predetermined value, wherein the resonance initialization control being performed by supplying a current alternatively to the electromagnets at a period corresponding to a specific oscillation frequency of a spring-mass oscillation system.

* * * * *